United States Patent
Sivley, IV (10) Patent No.: US 11,614,186 B1
(45) Date of Patent: Mar. 28, 2023

(54) BOX CONNECTION FOR A PIN WITH RELIEVED THREAD REGION

(71) Applicant: PTC Liberty Tubulars LLC, Wilmington, DE (US)

(72) Inventor: Robert S. Sivley, IV, Kingwood, TX (US)

(73) Assignee: PTC Liberty Tubulars LLC, Liberty, TX (US)

( * ) Notice: Subject to any disclaimer, the term of this patent is extended or adjusted under 35 U.S.C. 154(b) by 138 days.

(21) Appl. No.: 16/829,324

(22) Filed: Mar. 25, 2020

(51) Int. Cl.
*F16L 15/06* (2006.01)
*E21B 17/042* (2006.01)

(52) U.S. Cl.
CPC ............ *F16L 15/06* (2013.01); *E21B 17/042* (2013.01)

(58) Field of Classification Search
CPC ........ F16L 15/06; F16L 15/002; E21B 17/042
See application file for complete search history.

(56) References Cited

U.S. PATENT DOCUMENTS

| | | | | |
|---|---|---|---|---|
| 1,927,656 A | * | 9/1933 | Eaton | E21B 17/042 285/115 |
| 2,587,544 A | * | 2/1952 | Sneddon | F16L 15/002 285/333 |
| 2,772,102 A | | 11/1956 | Webb | |
| 4,121,862 A | * | 10/1978 | Greer | F16L 15/001 285/333 |
| 4,384,737 A | * | 5/1983 | Reusser | E21B 17/042 285/334 |
| 4,673,201 A | | 6/1987 | Dearden et al. | |
| 4,770,448 A | * | 9/1988 | Strickland | E21B 17/042 285/333 |
| 5,829,797 A | | 11/1998 | Yamamoto et al. | |
| 6,817,633 B2 | | 11/2004 | Brill et al. | |
| 6,893,057 B2 | | 5/2005 | Evans | |
| 7,438,329 B2 | | 10/2008 | DeLange et al. | |
| 8,136,846 B2 | | 3/2012 | Church | |
| 9,261,207 B1 | | 2/2016 | Nations, Jr. et al. | |
| 9,261,208 B1 | | 2/2016 | Nations, Jr. et al. | |

(Continued)

FOREIGN PATENT DOCUMENTS

| | | |
|---|---|---|
| CA | 2381711 A1 | 2/2001 |
| CA | 2171893 C | 10/2004 |

(Continued)

OTHER PUBLICATIONS

Metal One Corporation, "GEOCONN Casing Connection", retrieved from http://www.mtlo.co.jp/mo-con/geoconn.html, publicly available at least as early as Mar. 25, 2020.

(Continued)

*Primary Examiner* — David Bochna
(74) *Attorney, Agent, or Firm* — The Webb Law Firm (57) ABSTRACT

A modified API buttress threaded casing connection is disclosed for use in drilling oil and gas wells in lieu of using conventional drill pipe. The coupling threads only are modified to include a reduced thread height thread form to relieve thread stresses at axial ends of the coupling. The reduced thread height thread form may be mated with standard single tapered API buttress thread forms formed on the pin ends. The axial length of the coupling may be generally shortened to permit abutment of the mating pins at the center of the coupling.

13 Claims, 7 Drawing Sheets

(56) References Cited

U.S. PATENT DOCUMENTS

| | | | |
|---|---|---|---|
| 9,644,771 B1 | 5/2017 | Lane | |
| 10,077,603 B2 * | 9/2018 | Tejeda | E21B 17/042 |
| 10,273,765 B2 | 4/2019 | Lane | |
| 10,274,112 B2 | 4/2019 | Lane | |
| 10,378,683 B2 | 8/2019 | Suzuki | |
| 2011/0012347 A1 * | 1/2011 | Pacheco | E21B 17/042 |
| | | | 285/333 |
| 2017/0159853 A1 * | 6/2017 | Lane | E21B 17/042 |
| 2017/0314596 A1 | 11/2017 | Harvey et al. | |
| 2018/0266189 A1 * | 9/2018 | Mannella | E21B 17/042 |
| 2018/0356014 A1 | 12/2018 | DeHart | |
| 2019/0128075 A1 * | 5/2019 | Urech | E21B 17/042 |
| 2019/0203857 A1 | 7/2019 | Maruta et al. | |
| 2019/0211952 A1 | 7/2019 | DeHart | |

FOREIGN PATENT DOCUMENTS

| | | |
|---|---|---|
| CA | 2593318 C | 2/2014 |
| CA | 2743512 C | 12/2015 |
| CA | 2969250 A1 | 7/2016 |
| CA | 3021974 A1 | 11/2017 |
| CA | 3026557 A1 | 3/2018 |
| CA | 3026559 A1 | 3/2018 |
| CA | 3055505 A1 | 10/2018 |
| CA | 2947536 C | 2/2019 |
| CA | 2963456 C | 4/2019 |
| EP | 0815377 B1 | 12/2002 |
| WO | 2011147189 A1 | 12/2011 |
| WO | 2016130021 A2 | 8/2016 |
| WO | 2017189557 A1 | 11/2017 |
| WO | 2018052140 A1 | 3/2018 |
| WO | 2018052141 A1 | 3/2018 |
| WO | 2018180218 A1 | 10/2018 |
| WO | 2018226924 A1 | 12/2018 |
| WO | 2019138295 A1 | 7/2019 |

OTHER PUBLICATIONS

Precision LLC, "BK-HT Semi-Premium Connections", retrieved from https://precision-llc.com/connections/bk-ht-semi-premium-connection/, publicly available at least as early as Mar. 25, 2020.

U.S. Steel Tubular Products, "USS-CDC® Semi-Premium OCTG Connections", retrieved from https://usstubular.com/octg-products-and-services/octg-connections/semi-premium-connections/uss-cdc/, publicly available at least as early as Mar. 25, 2020.

\* cited by examiner

Figure 1

Prior Art

BOX CONNECTION FOR A PIN WITH RELIEVED THREAD REGION

BACKGROUND AND SUMMARY

The present disclosure is directed to a coupling used to secure to pipes. In particular, the disclosure is directed to a coupling used to join two pipes that are used in the oil and gas industry. As will become evident from the disclosure that follows below, the threaded coupling has been modified from the standard API buttress threading in a manner that allows the coupling to maintain its compatibility with standard API buttress threaded pins. In particular, a certain portion of the coupling thread surfaces are modified with cylindrical diameters to reduce the thread height while maintaining the pitch and thread depth diameter, and while the pins are formed in a conventional manner. The modification of the portion of the coupling threads tends to reduce and equalize make-up stresses through the thinner cross-sections of both the pins and coupling, thereby minimizing the possibilities of thread galling during connection assembly. The cylindrical diameters of the modified portion of the coupling thread surfaces reduce the bearing stresses, and therefore reduce the localized stress risers in the run-out pin threads where the connections commonly fail in fatigue under rotational cyclic loading. Additionally, the axial length of the coupling may be reduced to allow abutment of the two pins at the center of the coupling thereby maximizing the torque capabilities of the connection. Additionally, the coupling can be formed with an integral, sacrificial wear-sleeve extension on its outer surfaces thereby protecting the main body of the coupling from frictional wear as the casing is rotated down the well bore.

DETAILED DESCRIPTION

Figure 1:
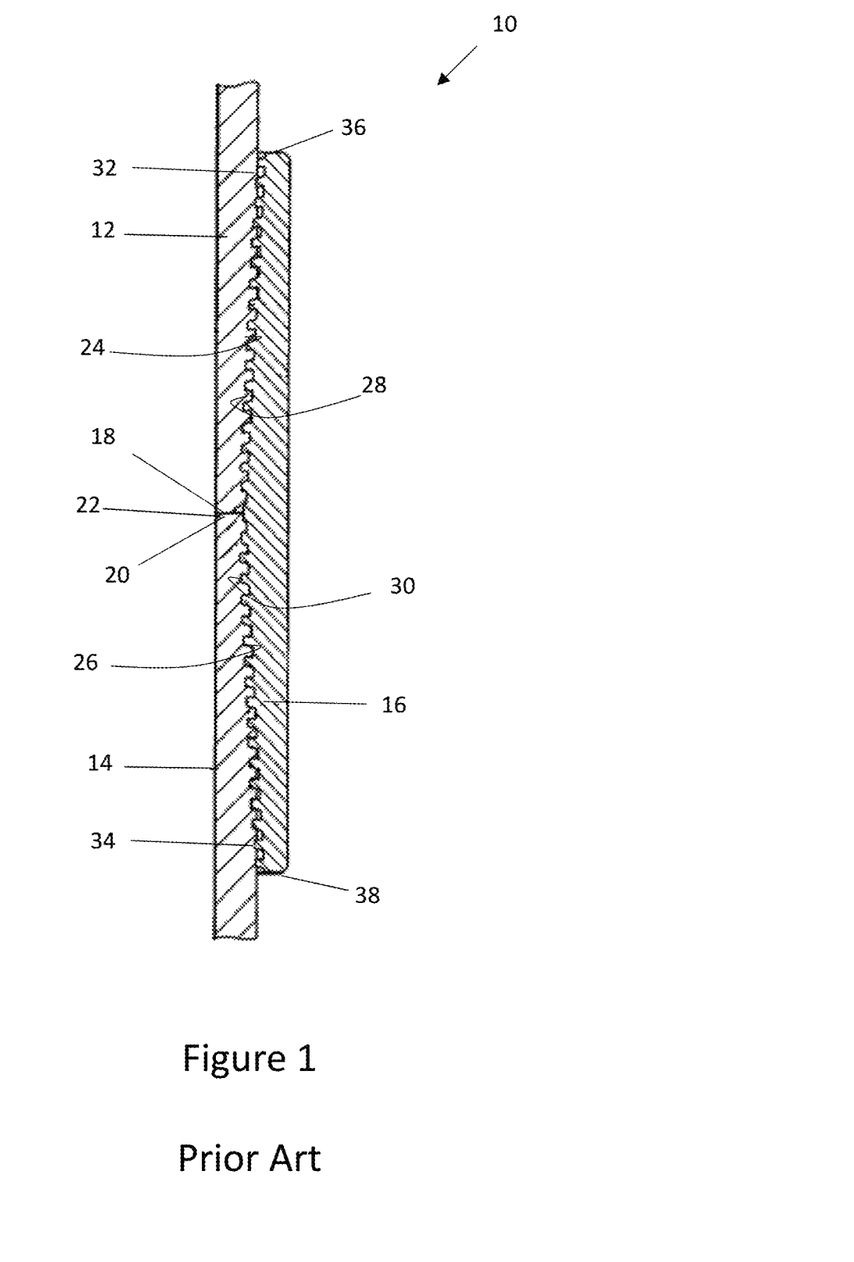
FIG. 1 is a partial cross-sectional side view of two pipe pin ends joined with a coupling of the prior art.

FIG. 1 shows a conventional casing string 10 with pin segments 12,14 and a coupling 16 with a standard API buttress threading applied to the pin segments and the coupling. Ends 18,20 of the pin segments 12,14 abut, and a "J" gap or "J" area 22 between the ends of the pin segments has been closed-up so the pin ends abut. The pin segments 12,14 each have pin thread regions 24,26 on the outside surface adjacent the respective ends 18,20 of each pin segment. The pin thread regions 24,26 mate with thread regions 28,30 on internal surfaces of the coupling 16. In the conventional API buttress threading scheme the pin thread regions 24,26 are formed with a taper and the run out threads 32,34 away from the pin ends 18,20 decrease in thread size until they are no longer formed on the pin segment. It is conventional with the API buttress thread form for the coupling thread regions 28,30 and the pin threaded regions 24,26 to have identical thread tapers so as to produce uniform radial thread interference through the full length of the thread profile. Thus, when the connection is assembled, the thread interference creates contact pressure and maximizes the sealing capabilities of the mating threads. It will be further noted in the conventional design shown in FIG. 1, the tapered thread forms of the pin segments 12,14, and the coupling 16 result in variable cross sections along the thread regions of each member with a thinner cross-section at the ends 18,20 of the pin segments, and a similar thinning cross-section at ends of the coupling ends 36,38. When the connection is assembled it is seen that the thinner cross-sections of the respective pin segments 12,14 and the respective portions of the coupling 16 are opposite the heavier cross-sections of the mating member. The cross-sections therefore are unbalanced at the thinner ends of both members. When the connection is assembled, there is imbalance between these cross-sections and resulting excessive hoop stresses in the thinner cross-sections. Also, couplings with the higher hoop stress may also fail under the repeated fracture cycles.

In particular, the cross-sections of the mating members vary along the thread profile. Therefore, if the interference between the threads is uniform, but the cross-sections behind the threads are variable, then the resulting hoop stresses created in the cross-sections is also variable—graduating from low stresses in the thicker part of the cross-section to high stresses in the thinner part of the cross-section of each member. Indeed, it has been found through Finite Element Analysis (FEA) that, after assembly, the hoop stresses in the thinner cross sections of both the pins and coupling can exceed the yield strength of the steel. In addition to the negative impact on the yield strength, in the thinner portions of the mating members, this differential yielding at the thin versus the thick cross-sections also causes differential movement between the threads at the same high stress points. This differential movement at the high stress points, in turn results in thread galling, predominantly at the ends 36,68 of the coupling 16, and the ends 18,20 of the pin segments 12,14. It is also anticipated that these same high stressed areas, particularly at the run-out threads 32,34 of the pin segments 12,14 could result in fatigue failure when the connections are rotated during installation.

Figure 2:
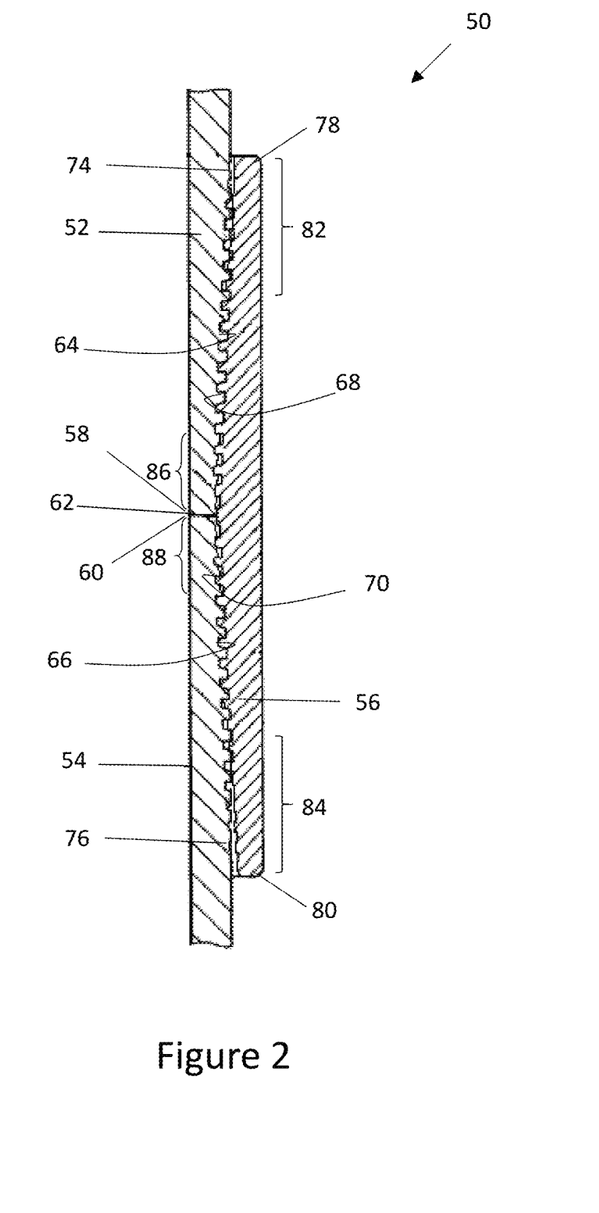
FIG. 2 is a partial cross-sectional side view of two pipe pin ends joined with a coupling with an exemplary coupling according to the present disclosure.

FIG. 2 shows pin segments and a coupling of the present disclosure which addresses the imbalance between the cross-sections and resulting excessive hoop stresses in the thinner cross-sections. The casing string 50 includes two pin segments 52,54 interconnected with coupling 56. Ends 58,60 of the pin segments abut in the "J" area 62. Faces of the ends 58,60 of the pin segments 52,54 are square cut to furnish maximum bearing face when butted together at a center of coupling 56. Elimination of the "J" area between the two pin segments allows the two pins to butt one another at the coupling center thereby maximizing the torque capabilities of the connection. The pin segments 52,54 include pin thread regions 64,66 on the outside surface adjacent the end of each pin segment. The pin thread regions 64,66 mate with thread regions 68,70 on internal surfaces of the coupling 56. The pin thread regions 64,66 are formed with standard API buttress threads with a constant taper angle. Run-out threads 74,76 on the pin segments away from the pin ends 58,60 are generally adjacent to coupling ends 78,80.

Again, a uniform taper between the pin thread regions 64,66, and the respective coupling thread regions 68,70 results in uniform interference along the thread profile. However, in the embodiment of FIG. 2, portions 82,84 of the API buttress thread form 68,70 on the coupling 56 are modified. In particular, the portions 82,84 of the coupling thread regions 68,70 adjacent to the coupling ends 78,80 and adjacent to the run out threads 74,76 of the pin segments 52,54 are modified. More in particular, the heights of the threads in the portions 82,84 of the coupling thread region adjacent to coupling ends 78,80 are reduced. However, the pitch of the reduced height threads and the thread depth diameter taper angle of the reduced height threads match the thread form of the remainder of the coupling thread regions 68,70. The reduction in thread heights on the portions 82,84 of the coupling thread regions 68,70 adjacent to coupling ends 78,80 has been found to: (i) moderate the concentrated high stresses previously outlined; (ii) minimize the thread galling in the areas of high stress; (iii) maintain compatibility with standard API buttress threaded pin members; and (iv) create a high torque connection by butting the pin ends at the center of the coupling.

Figure 3:
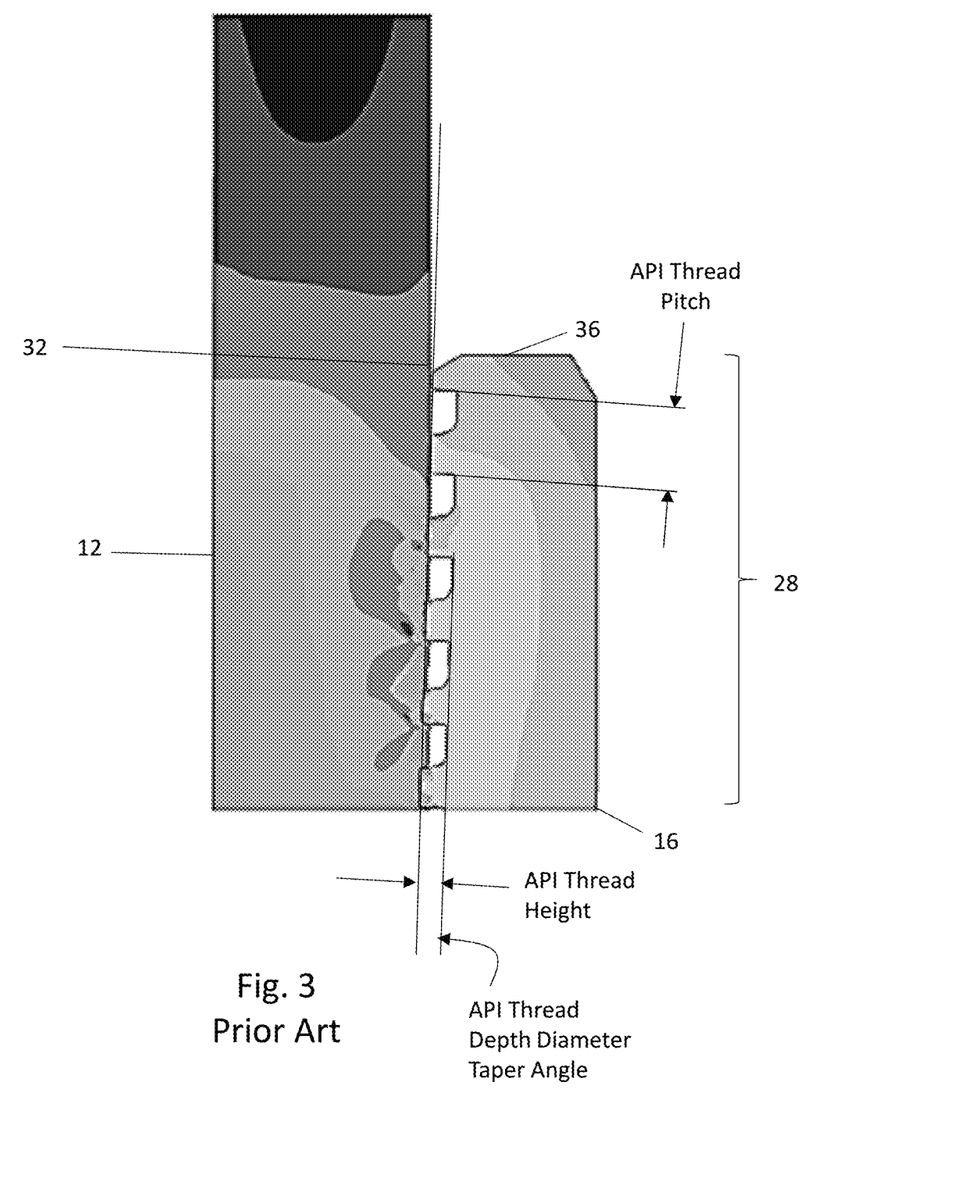
FIG. 3 is an enlarged, partial cross-sectional side view including a plot showing stress in the coupling and pipe when a coupling of the prior art, for instance, as shown in FIG. 1, is joined with a pipe pin end in accordance with the prior art, where darker areas show regions of relatively low stress and lighter areas show regions of relatively higher stress.
Figure 4:
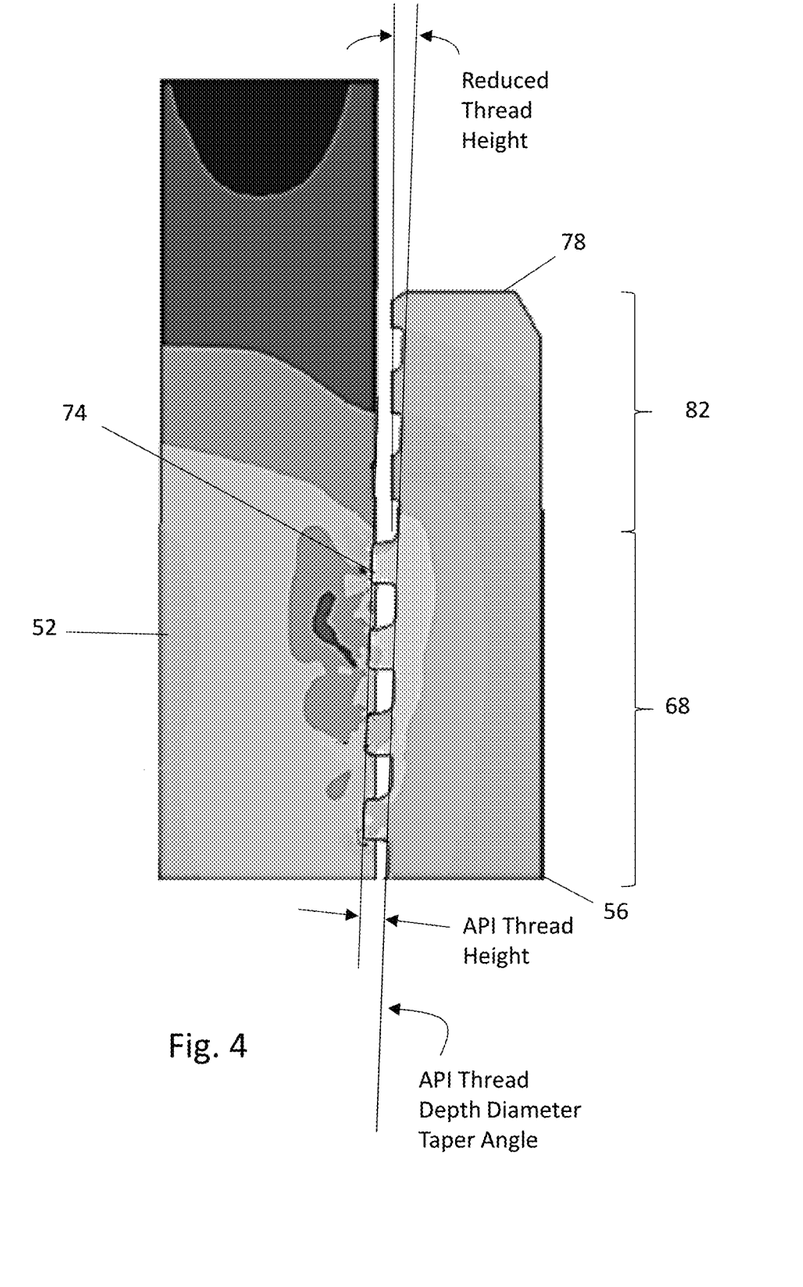
FIG. 4 is an enlarged, partial cross-sectional side view including a plot similar to the plot of FIG. 3 showing stress in the pipe and one embodiment of the coupling but where the coupling has a reduced height thread portion, and in particular, where the three threads in the reduced height thread portion have the same reduced thread height with a thread pitch and thread depth diameter taper angle matching the API buttress thread form of the remainder of the thread region of the coupling.
Figure 5:
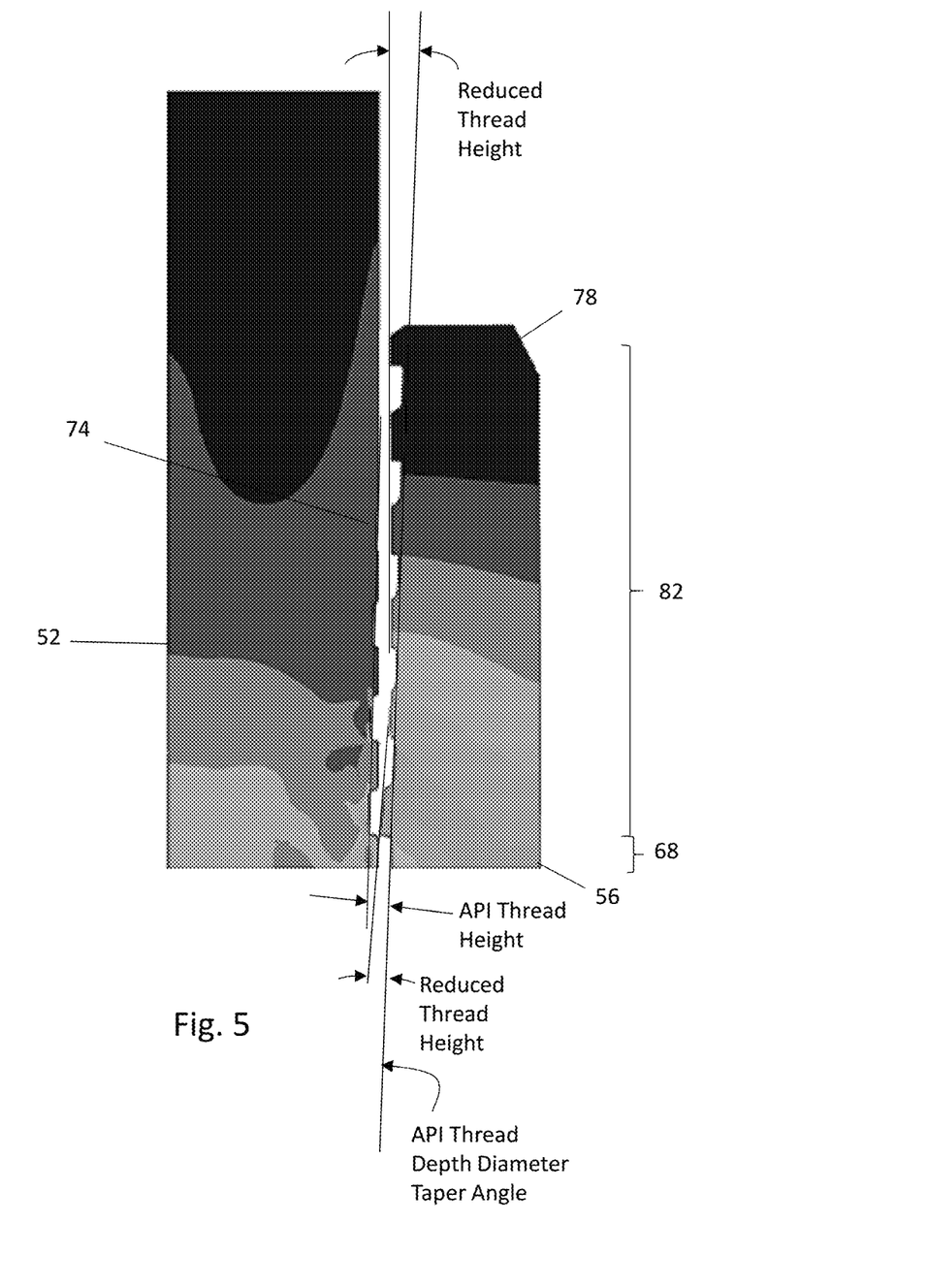
FIG. 5 is an enlarged, partial cross-sectional side view including a plot similar to the plot of FIG. 3 showing stress in the pipe and another embodiment of the coupling but where the coupling has a reduced height thread portion, and in particular, where four lead threads in the reduced height thread portion generally have the same thread height and two inside threads in the reduced height thread portion have a tapered reduced thread height at an angle different from the API buttress thread form of the remainder of the thread region of the coupling, but all of which having a thread pitch and thread depth diameter taper angle matching the API buttress thread form of the remainder of the thread region of the coupling.
Figure 6:
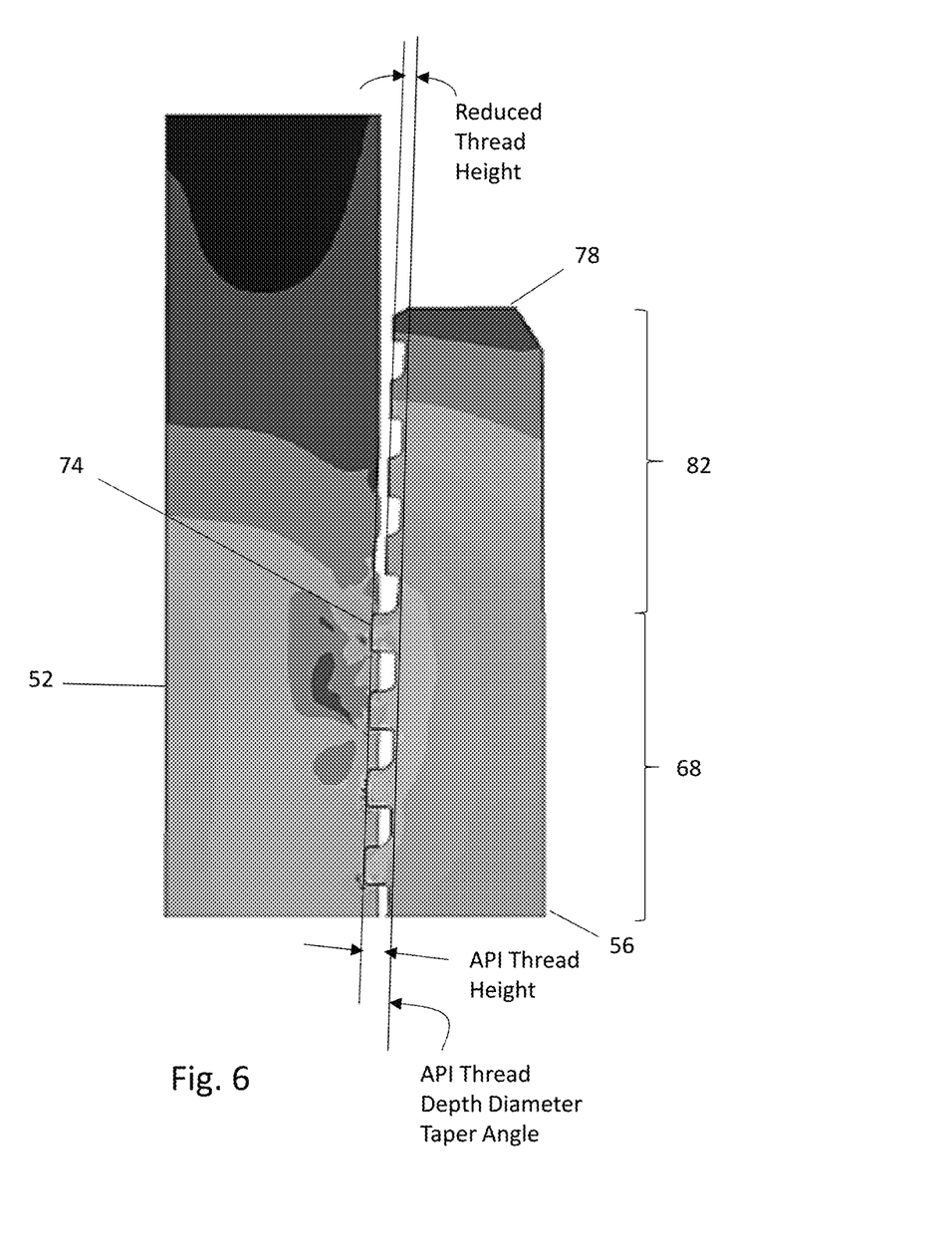
FIG. 6 is an enlarged, partial cross-sectional side view including a plot similar to the plot of FIG. 3 showing stress in the pipe and another embodiment of the coupling, but where the coupling has a reduced height thread portion, and in particular, where four threads in the reduced height thread portion generally have a tapered reduced thread height at an angle different from the API buttress thread form of the remainder of the thread region of the coupling, but with a thread pitch and thread depth diameter taper angle matching the API buttress thread form of the remainder of the thread region of the coupling.
Figure 7:
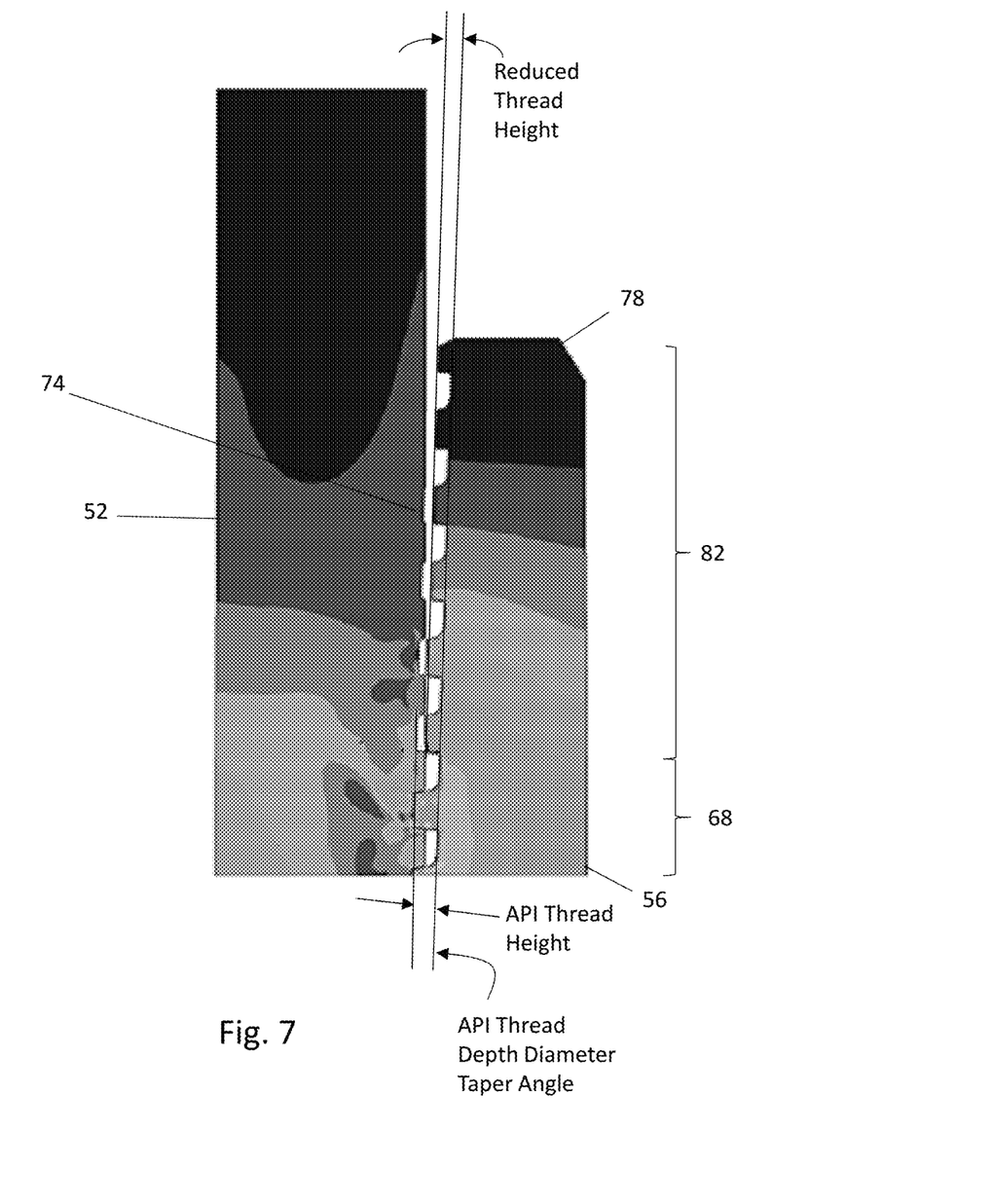
FIG. 7 is an enlarged, partial cross-sectional side view including a plot similar to the plot of FIG. 3 showing stress in the pipe and another embodiment of the coupling, but where the coupling has a reduced height thread portion, and in particular, where six lead threads in the reduced height thread portion generally have a tapered reduced thread height at an angle different from the API buttress thread form of the remainder of the thread region of the coupling, but with a thread pitch and thread depth diameter taper angle matching the API buttress thread form of the remainder of the thread region of the coupling.

The reduction in thread height in the portions 82,84 of the coupling thread regions 68,70 reduces stress in the threads of the coupling member 56 at an area of high stress, for example, the areas of cross-sectional imbalances at the coupling ends 78,80. A comparison of FIG. 3 to FIGS. 4-7 show the reduction of stress in the coupling in the areas at the coupling ends for various embodiments of couplings with reduced thread height portions 82,84. Additionally, the heights of the threads in portions 86,88 of the pin thread regions 64,66 may also be reduced at the areas of high stress, for instance, the areas of cross sectional imbalances at the ends 58,60 of the pin segments 52,54. In one example, for instance, as shown in FIG. 4, the portions 82,84 of the coupling thread regions 68,70 may be counter-bored after formation of the initial API buttress thread form to reduce the thread height to same relative thread height diameter while maintaining the same API buttress thread pitch and thread depth diameter taper angle. In another example, for instance as shown in FIGS. 6 and 7, the portions 82,84 of the coupling thread regions 68,70 may be tapered after formation of the initial API buttress thread form to reduce the thread height while maintaining the same API buttress thread pitch and thread depth diameter taper angle. In another, for example as shown in FIG. 5, a combination of counter boring certain threads to a reduced diameter and other threads to a taper to achieve the reduce thread height portion may be used, while maintaining the same API buttress thread pitch and thread depth diameter taper angle. The lengths and amounts of thread height reduction in the portions 82,84 of the coupling thread region and/or the portions 86,88 of the pin thread regions 64,66 may be chosen as needed to reduce contact pressure in areas of the connection where cross-sections are unbalanced. One or more threads in the portions 82,84 may be eliminated while other threads in the portion have their thread heights reduced. Additionally, the portions 86,88 on the pin thread regions 64,66 may be turned (using the schemes mentioned above or in other ways) while maintaining the same API buttress thread pitch and tread depth diameter taper angle. The reduction in thread height may be achieved by using different threading taper angles in the portions 82,84,86,88 than the threading taper angle of the API buttress thread form on the pin thread regions 64,66, and coupling thread regions 68,70, while maintaining the same API buttress thread pitch and thread depth diameter taper angle. The reduction in thread height may also be achieved with other profiles, such as elliptical or curved. The reduction of thread height in these areas relieves the interference in these high stress areas and reduces the contact pressure in the overstressed areas and thus mitigates the problems of high stresses, thread galling and fatigue failure. A short segmented profile of the reduced thread height portion is preferred because it maximizes the length of the segments, and uses the same taper on both members therefore maximizing sealing integrity. It is also preferred that the remaining portions of the pin thread regions 64,66 and the corresponding coupling thread regions 68,70 are made to standard API buttress specifications with no modifications to length, pitch, thread height taper angle, or thread depth diameter taper angle. This allows the casing pipes to be threaded by the many API licensed machine shops or mills with modification to the coupling and/or optionally the portions 86,88 of the pin thread regions 64,66. This tends to improve logistics as the couplings are more easily transported as opposed to 40 foot lengths of pipe. While the foregoing description makes reference to an API buttress thread form, another tapered, hydraulic sealing thread form may be used in accordance with the principles of the disclosure.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed:

1. A coupling adapted and configured to connect two pipes together,
    the coupling having axially opposite first and second ends,
    the coupling having a generally cylindrical outer surface extending between the first and second axially opposite ends,
    the coupling having a bore with a first portion and a second portion and a transition between the first portion and the second portion,
    the bore first portion having an inner region with fully formed and uniform threads of a tapered, hydraulic sealing thread form having an API buttress thread form with a constant taper angle and threads of uniform height and an outer region adjacent to the inner region, wherein the outer region has the same API buttress thread form with the same constant taper angle but with threads having a thread height less than the fully formed and uniform threads of the tapered, hydraulic sealing thread form wherein the threads of the outer region all have the same reduced thread height,
    the bore first portion outer region extending from the coupling first axial end to the bore first portion inner region,
    the bore first portion inner region extending from the bore first portion outer region to the transition,
    the bore second portion having an inner region with fully formed and uniform threads of a tapered, hydraulic sealing thread form having an API buttress thread form with a constant taper angle and threads of uniform height and an outer region adjacent to the inner region, wherein the outer region has the same API buttress thread form with the same constant taper angle but with threads having a thread height less than the fully formed and uniform threads of the tapered, hydraulic sealing thread form wherein the threads of the outer region all have the same reduced thread height,
    the bore second portion outer region extending from the coupling second axial end to the bore second portion inner region,
    the bore second portion inner region extending from the bore second portion outer region to the transition.

2. The coupling of claim 1 wherein the transition is at about a center of the coupling.

3. The coupling of claim 1 wherein the transition is adapted and configured to allow ends of pipes threaded in the coupling to abut each other at about the transition.

4. The coupling of claim 1 wherein the constant taper angle of the collective thread heights of the threads of bore second portion outer region is different from the constant taper angle of the threads of the fully formed and uniform threads of the tapered, hydraulic sealing thread form of the bore second portion inner region.

5. The coupling of claim 1 wherein the threads of bore first portion outer region are adapted and configured to align with run-out threads of a pipe fully threaded into the coupling bore first portion.

6. The coupling of claim 1 wherein the threads of bore second portion outer region are adapted and configured to align with run-out threads of a pipe fully threaded into the coupling bore second portion.

7. A coupling adapted and configured to connect two pipes together,
    the coupling having axially opposite first and second ends,
    the coupling having a generally cylindrical outer surface extending between the first and second axially opposite ends,
    the coupling having a bore with a first portion and a second portion and a transition between the first portion and the second portion,
    the bore first portion having an inner region with threads having a tapered thread form, the tapered thread form having an API buttress thread form with a constant pitch, a constant thread depth diameter taper angle, and a tapered thread height with threads of uniform height,
    the bore first portion having an outer region with threads having a thread height less than the thread height of the threads of the bore first portion inner region, the threads of the bore first portion outer region having an API buttress thread form with a constant pitch and a constant thread depth diameter taper angle matching the tapered thread form of the bore first portion inner region wherein the threads of the outer region all have the same reduced thread height,
    the bore second portion having an inner region with threads having a tapered thread form, the tapered thread form having an API buttress thread with a constant pitch, a constant thread depth diameter taper angle, and a tapered thread height with threads of uniform height,
    the bore second portion having an outer region with threads having a thread height less than the thread height of the threads of the bore second portion inner region, the threads of the bore second portion outer region having an API buttress thread with a constant pitch and a constant thread depth diameter taper angle matching the tapered thread form of the bore second portion inner region wherein the threads of the outer region all have the same reduced thread height,
    the bore first portion outer region extending from the coupling first axial end to the bore first portion inner region,
    the bore first portion inner region extending from the bore first portion outer region to the transition,
    the bore second portion outer region extending from the coupling second axial end to the bore second portion inner region,
    the bore second portion inner region extending from the bore second portion outer region to the transition.

8. The coupling of claim 7 wherein the transition is at about a center of the coupling.

9. The coupling of claim 7 wherein the transition is adapted and configured to allow ends of pipes threaded in the coupling to abut each other at about the transition.

10. The coupling of claim 7 wherein the constant thread depth diameter taper angle of the threads of bore first portion outer region is different from the constant thread depth diameter taper angle of the tapered thread form of the bore first portion inner region.

11. The coupling of claim 7 wherein the threads of bore second portion outer region collectively have thread heights formed on a taper.

12. The coupling of claim 7 wherein the threads of bore first portion outer region are adapted and configured to align with run-out threads of a pipe fully threaded into the coupling bore first portion.

13. The coupling of claim 7 wherein the threads of bore second portion outer region are adapted and configured to align with run-out threads of a pipe fully threaded into the coupling bore second portion.

\* \* \* \* \*